(No Model.)

G. ST. C. MANSON.
CLUTCH MECHANISM FOR BICYCLES.

No. 542,392. Patented July 9, 1895.

Witnesses:

Inventor
George St. C. Manson
by D. R. Fitzgerald
Atty.

United States Patent Office.

GEORGE ST. CLAIR MANSON, OF CHICAGO, ILLINOIS.

CLUTCH MECHANISM FOR BICYCLES.

SPECIFICATION forming part of Letters Patent No. 542,392, dated July 9, 1895.

Application filed March 29, 1895. Serial No. 543,729. (No model.)

*To all whom it may concern:*

Be it known that I, GEORGE ST. CLAIR MANSON, a citizen of the United States, residing at Chicago, in the county of Cook, State of Illinois, have invented certain new and useful Improvements in Clutch Mechanism for Bicycles; and I do hereby declare the following to be a full, clear, and exact description of the invention, such as will enable others skilled in the art to which it appertains to make and use the same.

My invention has relation to clutch mechanism for bicycles, and more particularly to that class in which the pedal sprocket-wheel by means of a chain operates a sprocket-wheel on the main driven, the said main-driven sprocket-wheel being provided with a clutch mechanism, whereby the forward motion of the pedals will propel the machine and at the same time, when the rider is coasting or has attained sufficient velocity or momentum to carry him a considerable distance, the main-driven shaft continues its revolutions with the wheel, while the driven and driving sprocket-wheels, the chain, and the pedals remain stationary, thus providing a rest for the rider, his only attention being required to guide his machine; and to these ends the novelty consists in the construction, combination, and arrangement of the several parts of the same, as will be hereinafter more fully described, and particularly pointed out in the claims.

In the accompanying drawings the same letters of reference indicate like parts of the invention.

Figure 1:
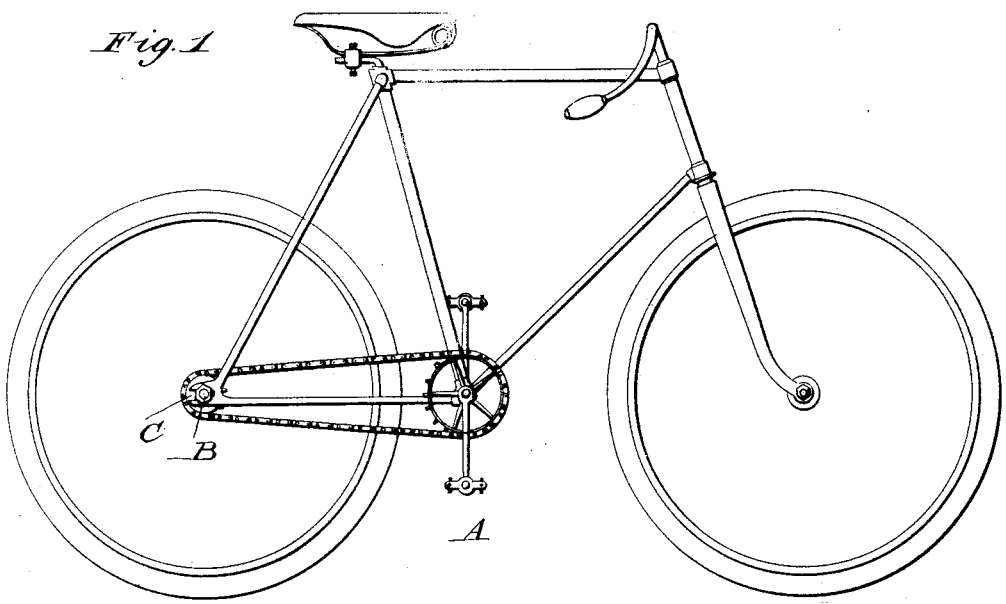
Figure 2:
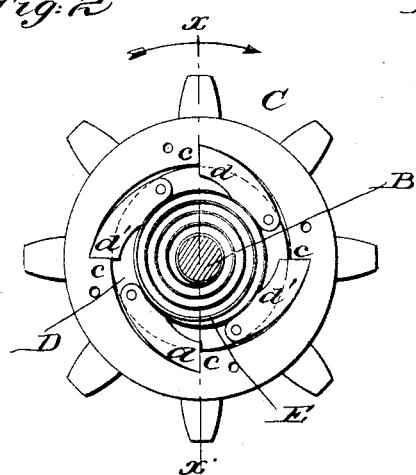
Figure 3:
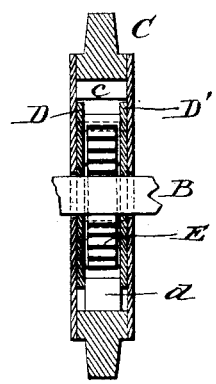

Figure 1 is a side elevation of a bicycle provided with my improved clutch-propelling mechanism. Fig. 2 is a side view of the sprocket-wheel clutch detached from the machine and having its side plate removed to show the clutch mechanism; and Fig. 3 is a cross-section on line $x$ $x$, Fig. 2.

A represents an ordinary form of bicycle having the usual pedals, driving-shaft, sprocket-driver, and chain.

On the rear axle B is mounted the clutch-propelling sprocket-wheel C, which is driven by the chain in the usual manner. This sprocket-wheel C is mounted loosely on the shaft, and its internal periphery is provided with a series of detents $c$ $c$, which engage a series of pawls $d$ $d'$, pivoted between a pair of disks D D', which form a sort of cage or box and which are rigidly mounted on a shaft within the sprocket-wheel. Within these disks D D' and coiled upon the shaft is a spiral spring E, the inner end of which is secured to the shaft and the outer end is free, and the outer coil thereof presses equally against all the pawls and holds them in the detents. At the same time when the sprocket-wheel is stationary the spring gives and allows the pawls to ride over the detents.

It will be seen that the sprocket-wheel C transmits motion to the shaft B through the medium of its detents $c$ $c$, the pawls $d$ $d'$, mounted between the disks D D', thence to the shaft B, and if the pedal-wheel be propelled in the direction of the arrows the spring presses the pawls into the detents, and through this means the sprocket-wheel is to all intents and purposes practically rigid on the shaft, as if it were keyed there.

If the rider is coasting or has acquired sufficient momentum and desires to rest himself, he simply allows his feet to remain at rest on the pedals. This stops the pedal-wheel, the chain, and the sprocket-wheel C, while the shaft, the spring, and the disks carrying the pawls continue to rotate, said pawls freely passing the inclined faces of the detents without communicating any motion whatever to the sprocket-wheel C, which would be the case if the sprocket-wheel were rigidly secured upon the shaft, instead of loosely mounted therein, as is herein shown.

Having thus fully described my invention, what I claim as new, and desire to secure by Letters Patent, is—

1. In a bicycle, the combination, with a sprocket wheel loosely mounted upon the driven shaft, a clutch mechanism located within the sprocket wheel and having a series of detents on its inner periphery and a series of pawls designed to engage the detents, of a spring rigidly secured to the shaft and coiled inside the pawls to engage therewith whereby the same are held in engagement with the detents, substantially as described.

2. In a bicycle propelling mechanism, the shaft B, having one end of the spring E secured thereto and mounted on said shaft, and having its outer end pressing against the pawls $d\ d'$, the free end of said pawls adapted to engage one of a series of detents $c$ in the sprocket wheel C, whereby the latter is enabled to convey motion in one direction only to said shaft B, substantially as and for the purpose described.

In testimony whereof I affix my signature in presence of two witnesses.

GEORGE ST. CLAIR MANSON.

Witnesses:
L. A. PARKER,
CHAS. P. SMALL.